April 16, 1963    M. A. DE CORTE ETAL    3,085,449
AUTOMATIC TRANSMISSION CONTROL SYSTEM
Original Filed May 24, 1957    3 Sheets-Sheet 1

INVENTORS
Michael A. DeCorte
& Richard W. Townsend
BY Edwin C. McRae
John R. Faulkner
Donald J. Harrington
Attorneys

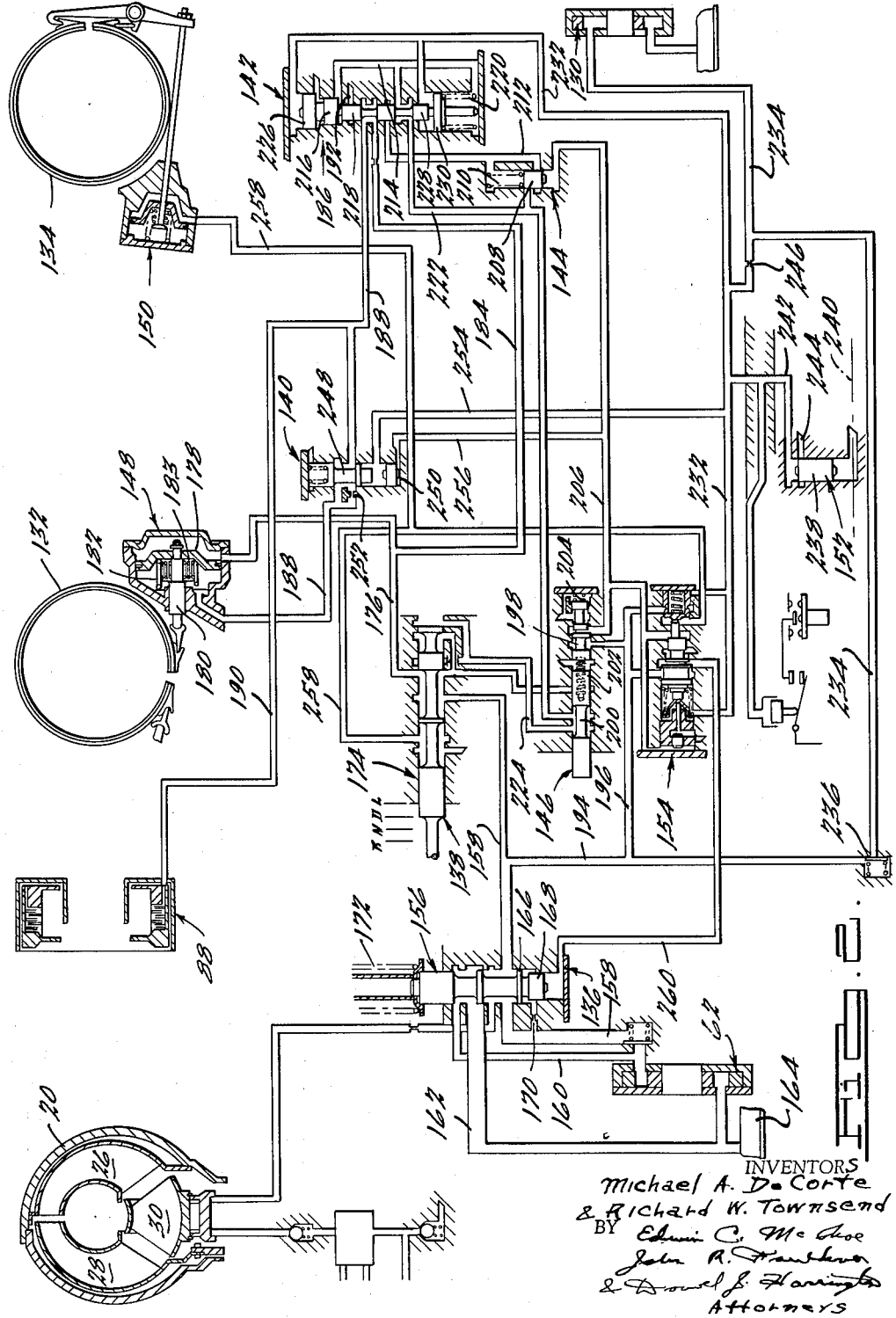

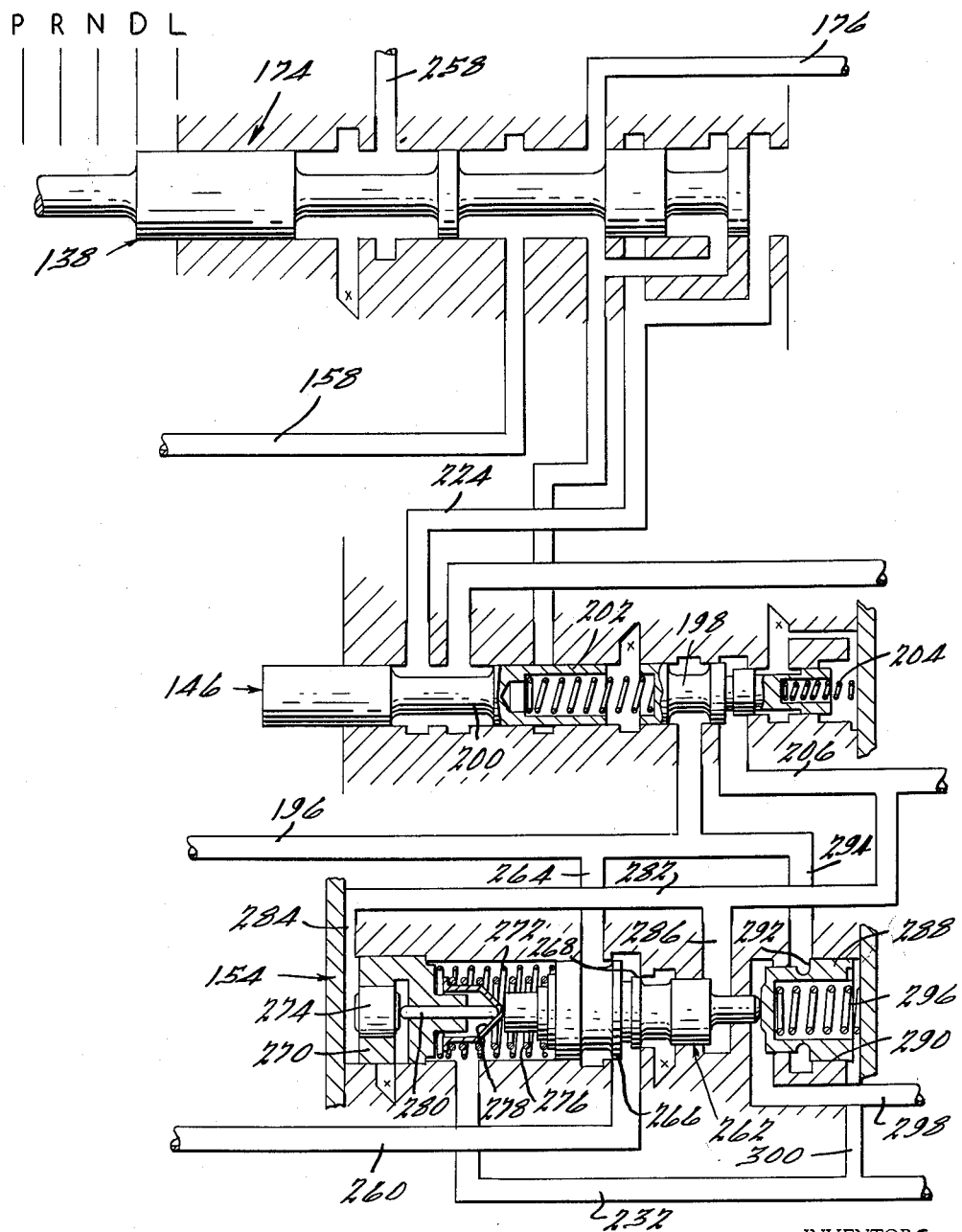

United States Patent Office 3,085,449
Patented Apr. 16, 1963

3,085,449
AUTOMATIC TRANSMISSION CONTROL SYSTEM
Michael A. De Corte and Richard W. Townsend, Phoenix, Ariz., assignors to Ford Motor Company, Dearborn, Mich., a corporation of Delaware
Continuation of application Ser. No. 661,489, May 24, 1957. This application Mar. 9, 1959, Ser. No. 799,066
19 Claims. (Cl. 74—752)

Our invention relates generally to a fluid pressure operated control system and more particularly to an automatic control system for a multiple speed, power transmission mechanism. The control system of our instant invention is particularly adapted to be used with a power transmission mechanism of the automotive type for delivering driving power from the vehicle engine to the vehicle traction wheels.

Our parent application, Serial No. 661,489, of which the instant case is a continuation, now is forfeited in favor of this case.

It is common practice in the automatic transmission art to employ fluid pressure operated clutches and brakes for regulating the relative motion of transmission gear elements which cooperate with a hydrokinetic torque converter unit to form a power delivery path from a driving member to a power output driven member. These control clutches and brakes include fluid pressure operated servos forming a portion of a control system of the type herein described, said control system including a fluid pressure source such as an engine driven pump or a tail shaft driven pump. Conduit structure interconnects the fluid pressure source and the fluid pressure operated servos and this conduit structure is partly defined by one or more shift valves adapted to selectively distribute control pressure to the various clutches and brakes in timed sequence thereby establishing the various speed ratio shift patterns during operation. The shift valves are subjected to a vehicle speed sensitive pressure supplied by a tail shaft driven speed governor and to a pressure sensitive to engine torque demand, the latter pressure being established by a vehicle operator controlled throttle valve capable of converting control pressure from the fluid pressure source to a reduced, regulated pressure which is proportional in magnitude to the degree of engine throttle opening. This torque demand sensitive pressure and the above-mentioned speed sensitive pressure act on the shift valve and create opposed valve actuating forces, the ratio of the forces determining the operating position of the shift valve.

A pressure regulator valve means is situated in cooperating relationship with respect to the fluid pressure source for establishing the required pressure level in the fluid circuit, the magnitude of the optimum control pressure level being dependent upon the torque requirements of the transmission mechanism. During operation at relatively high torque levels, the control clutches and brakes must be energized to a higher degree than that which is necessary for operation at lower torque levels in order that the capacity of the control clutches and brakes might be adequate to accommodate the torque delivery.

Line pressure regulation is accomplished in certain control systems of known construction by subjecting the main regulator valve to a compensator pressure which in turn is a function of both the above-mentioned engine torque sensitive pressure, hereinafter referred to as throttle pressure, and the vehicle speed sensitive pressure, hereinafter referred to as governor pressure. This compensator pressure is produced by an independently operated compensator valve mechanism and it is caused to act upon the main regulator valve to influence the regulating characteristics thereof whereby the magnitude of the control pressure is an inverse function of the magnitude of the compensator pressure. The compensator pressure is in turn inversely proportional to throttle pressure and is directly proportional to governor pressure. It is thus apparent that the magnitude of the control pressure will increase upon an increase in the throttle pressure for a given governor pressure and will decrease upon an increase in governor pressure for a given throttle pressure.

The improvement of our instant invention is principally directed to an improved compensator valve construction which is automatically operable to prevent the control pressure from decreasing to a value which is less than certain established minimum limits as the vehicle speed continues to increase for any given engine throttle setting.

Our improved compensator valve is further characterized by means for overruling the influence of the throttle pressure on the regulating characteristics of the same whenever the engine throttle setting increases beyond a predetermined established position.

During operation of the transmission it is necessary to maintain a control pressure which is sufficiently large to energize the clutch and brake control elements to a degree sufficient to maintain the required torque transmitting capacity. However, it is equally important to prevent the control pressure from rising to a value which is greater than that which is necessary to maintain the required capacity in the clutch and brake elements since a control pressure which is greater than that which is required will cause roughness during application of the transmission clutches and brakes and the character of the shift pattern will lack that degree of smoothness which is desirable in automatic transmissions for automotive use. During the initial stages of the acceleration period the engine torque will be roughly proportional to the engine throttle opening, and for this reason the control pressure is caused to vary in response to corresponding variations in the magnitude of the compensator pressure, the latter being a function of the throttle pressure and the throttle setting as above explained. However, when the engine throttle setting exceeds a certain limiting value—e.g. 40% of wide open throttle—the change in engine torque is relatively slight during any subsequent throttle movement beyond the 40% setting. It therefore becomes necessary to incorporate in the compensator valve some means for overruling the influence of the throttle pressure on the same whenever the throttle pressure exceeds that value corresponding to the above-mentioned limiting value of the engine throttle setting. This is accomplished in certain prior art control systems by incorporating a throttle pressure modulator valve acting in cooperation with the compensator valve for cutting off communication between the throttle valve and the compensator valve whenever the throttle pressure exceeds the desired limiting value. By way of contrast, this function is accomplished in the improved compensator valve construction of our instant invention by means of internally situated pressure operated elements which form a part of the compensator valve assembly itself thereby eliminating the need for providing a separate throttle pressure modulator valve together with the associated fluid pressure passages.

Another principal feature of our improved valve construction is concerned with a means for rendering the compensator valve insensitive to variations in governor pressure whenever the relationship of the governor pressure to the throttle pressure falls outside an established operating region. The valve structure giving rise to this latter function also forms a part of the compensator valve assembly. When the vehicle accelerates from a standing start, the ratio of the speed of the power input shaft to the speed of the power output tail shaft progressively increases and the torque requirements of the gear train decrease quite rapidly because of the rapidly changing torque ratio characteristic of the transmission torque converter unit and because of the relatively slight change in engine torque with engine speed. After the torque converter reaches the clutch point and after the vehicle engine becomes relatively stabilized, the variation in the torque requirements with any further change in speed ratio of the power input shaft of the gear train and the tail shaft will be relatively slight. It is thus necessary to render the compensator valve relatively insensitive to governor pressure after this point is reached thereby preventing the torque capacity of the transmission clutches and brakes from falling below a limiting minimum value.

The provision of an improved control system of the type above described being a principal object of our invention, it is a further object of our invention to provide a compensator valve of the type above described which is adapted for use in an automatic transmission control circuit and which is of simplified construction.

It is another object of our invention to provide a compensator valve of the type above set forth which may be readily adapted to be used in a variety of control circuits for various multiple speed, automatic, power transmission mechanisms.

It is a further object of our invention to provide a compensator valve capable of establishing a compensator pressure in a control circuit of the type above described and which includes an inherent pressure limiting feature capable of rendering the mechanism relatively insensitive to changes in throttle pressure when the engine throttle setting exceeds a predetermined value for a given governor pressure.

It is a further object of our invention to provide an improved compensator valve of the type above described wherein means are provided for inherently rendering the same relatively insensitive to changes in governor pressure at vehicle speeds greater than a predetermined value for any given throttle setting.

It is a further object of our invention to provide an improved compensator valve for a control circuit of the type above described which is capable of establishing a compensator pressure for influencing the operation of the main regulator valve of the control circuit so as to maintain the control pressure at an optimum pressure level during operation.

For the purpose of more particularly describing the improvement of our instant invention, reference will be made to the accompanying drawings wherein:

FIGURE 2 is a schematic valve circuit diagram of a control circuit embodying the improvements of our instant invention which may be used with the automatic transmission of FIGURE 1; and FIGURE 3 is an enlarged view of a portion of the schematic diagram of FIGURE 2.

Figure 1:
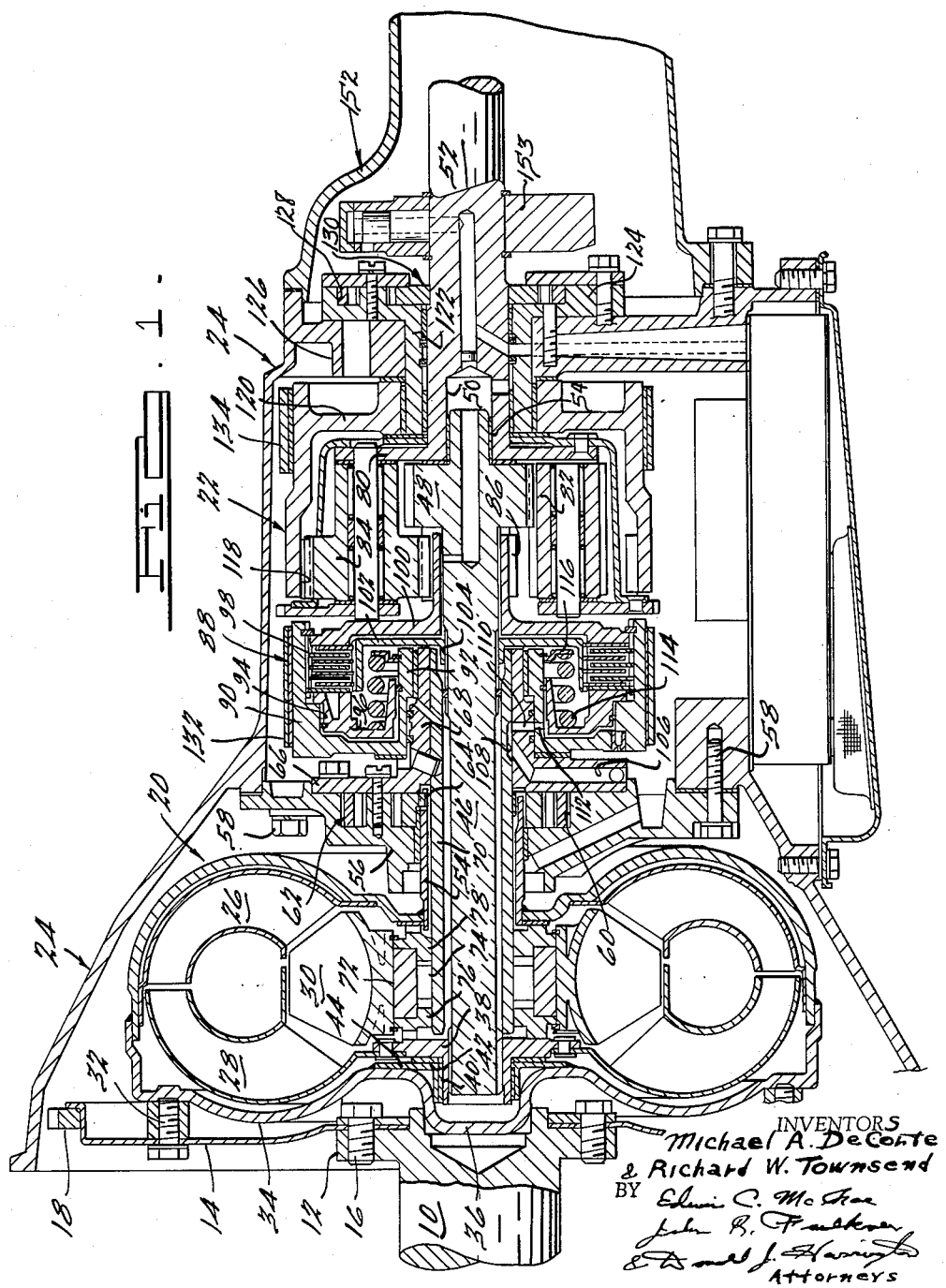
FIGURE 1 is a cross sectional view of a two-speed automatic transmission employing a torque converter and a cooperating planetary gear train and which is capable of incorporating the improved control circuit of our instant invention.

Referring first to FIGURE 1, numeral 10 designates the end of a crankshaft for a vehicle engine and it is formed with a flange 12 to which a drive plate 14 may be secured by means of bolts 16, said drive plate carrying a starter ring gear 18 capable of cooperating with an engine starter motor pinion, not shown. The transmission itself is comprised of two principal portions, namely, a hydrokinetic torque converter portion 20 and a planetary gear portion 22, said portions being enclosed by a common transmission casing 24. The casing 24 may be bolted to the rear of the vehicle engine in a conventional fashion.

The torque converter 20 is defined by a bladed pump member 26, a bladed turbine member 28, and a bladed reactor member 30, said reactor member being situated at the inner side of the fluid torus between the exit side of the turbine 28 and the inlet side of the pump 26. The pump 26 is drivably connected to the drive plate 14 by bolts 32. The converter is enclosed by a converter casing defined in part by a substantially radial shell 34 which may be formed with a pilot portion 36.

The turbine member 28 is secured to a central hub 38 which in turn may be journaled in bushings 40 and 42, said bushings being supported by a thrust member 44 fixed to the shell 34.

The turbine hub 38 is positively splined to a central power delivery shaft 46 which in turn is integrally connected to a planetary sun gear 48 of the planetary unit 22. The rear end of the shaft 46 is of reduced diameter and is journaled within an opening 50 formed in a power output tail shaft 52, suitable bearings 54 being provided for this purpose.

The hub of the torque converter pump member 26 is integrally secured to an axially extending sleeve shaft 54 which in turn is rotatably journaled in a transverse wall 56 secured to the transmission casing 24 by means of bolts 58. The transverse wall 56 is formed with a pump cavity 60 within which is mounted a gear type positive displacement fluid pump 62 of conventional construction, the driving gear of the pump 62 being keyed to the sleeve shaft 54 as indicated at 64.

The pump cavity 60 is partly enclosed by a stationary member 66 having an axial extension 68. A stationary reactor sleeve shaft 70 is secured within the axial extension 68 of the member 66 and it extends forwardly to provide a support for the reactor 30. The hub of the reactor 30 is formed with a circular bore within which is received an outer race member 72 of a one-way clutch 74, the inner race for the clutch 74 being the sleeve shaft 70. Clutch retainer members 76 and 78 are provided for supporting the reactor and for maintaining the one-way clutch assembly in assembled relationship.

The power output tail shaft 52 may be integrally joined to a carrier member 80 for the planetary gear unit 22 and it is adapted to rotatably journal a plurality of planet pinions 82 which mesh with the sun gear 48. The planet pinions 82 are in turn situated in driving engagement with planet pinions 84, the pinions 82 and 84 being journaled on the common carrier 80.

A second sun gear 86 drivably engages the planet pinions 84 and it is adapted to rotate relative to the power delivery shaft 46.

A multiple disc direct drive clutch assembly is indicated at 88 and it is comprised of an annular, drum shaped member 90 having a central hub 92 which is rotatably journaled on the axial extension 68 of the member 66. The drum shaped member 90 defines an annular cavity 94 within which is positioned an annular piston 96. The piston 96 is adapted to act against a series of multiple clutch discs 98 as indicated, said discs being disposed between piston 94 and a clutch plate backup member 100. Alternate ones of the discs 98 are positively splined to the inner surface of the drum shaped member 90 and the other discs 98 are splined to a clutch member 102 which in turn is positively connected to the power delivery shaft 46 as indicated at 104.

The clutch member 100 is splined to the drum shaped member 90 and when the multiple clutch discs 98 are compressed by the annular piston 96, the sun gears 48 and 86 will be effectively clutched together thereby causing the same to rotate in unison to produce a 1:1 driving ratio through the planetary unit 22. The multiple clutch discs 98 may be energized by subjecting the annular piston 96 to a fluid control pressure which may be supplied through a control pressure conduit defined in part by passage 106, groove 108 formed in sleeve shaft 70, the radial passage 110 formed in extension 68 of the member 66 and opening 112 formed in the hub 92 of the drum shaped member 90. The annular piston 96 may be returned to an inoperative position by a return spring 114, said spring 114 being seated on a spring seat member 116.

The planetary unit 22 is formed with a ring gear 118 which is in driving engagement with planet pinons 84 as indicated and which is carried by a radial member 120 journaled on an extension 122 of a stationary casing element 124. The element 124 may be permanently secured to an end wall 126 of casing 24 and it is formed with a cavity 128 for accommodating a gear type positive displacement pump identified in FIGURE 1 by numeral 130. The driving gear of pump 130 may be positively keyed to the power output tail shaft 52 as indicated.

The drum shaped member 90 may be surrounded by the brake band 132 for selectively braking the sun gear 86 of the planetary unit 22 to obtain a low speed gear reduction. Similarly, the ring gear 118 of the planetary unit may be braked by means of a brake band 134 encircling the periphery of member 120 as indicated to obtain reverse gear ratio.

It will be apparent from the foregoing description that the transmission is capable of providing two forward speed ratios and a reverse gear ratio. The first forward speed may be obtained by energizing brake band 132 thus holding sun gear 86 in a stationary position. Power will then be delivered from the crankshaft 10 through the torque converter 20 to the power delivery shaft 46 and the sun gear 48. The torque converter 20 will function in common fashion to multiply the torque being transmitted from the pump member 26 to the turbine member 28 during the torque conversion range. It is thus apparent that the pinions 84 will be caused to ride around the stationary sun gear 86 thus causing the carrier 80 and the power output tail shaft 52 to rotate at a reduced speed ratio. To obtain an increased speed ratio, the brake band 132 may be de-energized and the multiple disc clutch may be energized thus locking together the sun gears 86 and 48 to produce a 1:1 driving ratio between the driving shaft 46 and the power output tail shaft 52.

To obtain reverse drive, the multiple disc clutch and the forward brake band 132 are both de-energized and the brake band 134 is energized thereby anchoring the ring gear 118 of the planetary unit 22. The planet pinions 84 are thus caused to rotate about their respective axes and to ride within and mesh with the stationary ring gear 118 thereby causing the carrier 80 and the power output tail shaft 52 to rotate in a reverse direction.

Referring next to FIGURE 2, we have schematically illustrated a control valve circuit capable of being used with the transmission illustrated in FIGURE 1. The principal components of the control circuit of FIGURE 2 comprise the engine driven gear pump 62, the tail shaft driven pump 130, a main regulator valve 136, a manual valve 138, an orifice control valve 140, a shift valve 142, a throttle modulator valve 144, a throttle valve 146, a low speed brake servo 148, a reverse brake servo 150, a governor valve 152, and an improved compensator valve 154.

The regulator valve 136 is comprised of a multiple land valve spool 156 slidably positioned within a mating valve chamber. Pump discharge pressure passages 158 and 160 communicate with the main regulator valve chamber at spaced locations and a corresponding passage 162 interconnects the regulator valve chamber with the intake side of the pump 62 and with the low pressure sump 164. The valve spool 156 is formed with spaced valve lands 166 and 168 of differential diameter and the differential area produced by the lands 166 and 168 is subjected to pump discharge pressure through a restricted branch passage 170 as indicated. The spool valve 156 is thus urged in an upward direction, as viewed in FIGURE 1, by the pump discharge pressure against the opposing force of a regulator valve spring 172. When the valve spool 156 assumes a predetermined operating position, it is effective to provide communication between pump discharge passage 160 and pump return passage 162, the degree of restriction provided by the regulator valve being progressively smaller as the valve spring 172 becomes compressed. Upon a further pressure buildup on the discharge side of the pump 62 the spool valve element 156 will move to a position which will provide communication between discharge passage 158 and pump return passage 162. It is thus apparent that the magnitude of the pressure which exists in the pump discharge passage 158 will be maintained at a relatively constant value for any given set of driving conditions depending upon the calibration of the spring 172.

The pump discharge passage 158 communicates with the manual valve 138 as indicated. The manual valve 138 comprises an adjustable spool valve element 174 having spaced valve lands which cooperate with the associated valve chamber to provide communication between the control pressure passage 158 and the passage 176 extending to the apply side of a fluid pressure operated piston 178 of the fluid pressure brake servo 148. Piston 178 is mechanically connected to a brake actuating plunger 180 slidably situated in the servo casing, said plunger 180 being adapted to engage one end of the brake band 132, the other end thereof being anchored as indicated. The piston 178 is urged toward a de-energized position by springs 182 and 183. It will be apparent from an inspection of FIGURE 2 that the piston 178 and the plunger 180 have a lost motion connection therebetween and that following the initiation of the brake energizing cycle, the fluid pressure force acting on the piston 178 is transmitted to the plunger 180 through the spring 183. After the limit of the lost motion is obtained, the force on the piston 178 is transmitted directly to the plunger 180 and the brake energizing force applied to the brake band 132 is at a maximum. The spring 183 and the lost motion connection between the piston 178 and the plunger 180 cooperate to permit a cushioned brake engagement.

Control pressure passage 176 communicates with passage 184 which in turn extends to shift valve 142. The shift valve 142 comprises a multiple land valve element 186 situated in a cooperating valve chamber to which the conduit 184 extends. The valve element 186 is capable of assuming either of two positions, namely, the position shown in FIGURE 2 or an upward position wherein the upper end of the valve element 186, as viewed in FIGURE 2, engages the end of the associated valve chamber. When the valve element 186 assumes the upward position, passage 184 is blocked by the adjacent valve land of valve element 186. However, when the valve element 186 assumes the position shown in FIGURE 2, communication is established between passage 184 and a passage 188 which extends through the orifice control valve 140 to the release side of the piston 178 for the servo 148. Passage 188 further communicates with branch passage 190 which extends to the servo for the above described multiple disc clutch 88.

It is thus apparent that when the manual valve 138 assumes the drive position as indicated in FIGURE 2, the apply side of the servo 140 will be continuously pressurized and the release side of the servo 148 will be selectively energized as determined by the position of the shift valve element 186. Also, since the multiple disc clutch assembly 88 becomes pressurized whenever the release side of the servo 148 is pressurized, the transmission will assume a low speed ratio whenever the shift valve 148 assumes an upward position and it will assume a high speed ratio when the shift valve element 186 assumes the position shown in FIGURE 2. When the shift valve element 186 is moved from the position shown in FIGURE 2 to a downshift position, passage 188 and communicating passage 190 will simultaneously be exhausted through an exhaust port 192 and the passage 184 will be simultaneously blocked.

Control pressure is transferred from the passage 158 to throttle valve 146 through passages 194 and 196. The throttle valve itself is comprised of a compound valve spool having a first portion 198 and a second portion 200, the latter portion being adapted to be mechanically connected to the throttle linkage of the vehicle engine to permit manual operation of the same. The motion imparted to the valve portion 200 variably compresses spring 202, and the force of valve spring 202 is transmitted to valve portion 198. An opposing valve spring 204 is provided as shown for urging the valve spool portion 198 in a left-hand direction as viewed in FIGURE 2. It is apparent from an inspection of FIGURE 2 that the valve lands of the valve spool portion 198 provide restricted communication between passage 196 and the throttle pressure passage 206, the throttle pressure produced in passage 206 being effective to act on the differential area of the cooperating valve land to urge the valve spool portion 198 in a left-hand direction.

The throttle modulator valve 144 is comprised of a single valve plunger 208 urged in a downward direction by a valve spring 210. Throttle pressure in passage 206 is caused to act on the lower end of plunger 208. The degree of communication between passage 206 and a communicating passage 212 extending to the valve chamber for the shift valve 142 is reduced by reason of the action of spring 210. When the shift valve element 186 assumes the upward or downshift position, the modulated throttle pressure in passage 212 will be transferred through the shift valve chamber to branch passage 214 which in turn is effective to deliver modulated throttle pressure to the lower side of the shift valve element 186 and to the differential area produced by shift valve lands 216 and 218. The upward force produced by the modulated throttle pressure is supplemented by a shift valve spring 220.

When the shift valve element 186 assumes the upshift position shown in FIGURE 2, passage 212 will be blocked as indicated and passage 214 will communicate with passage 222 through the shift valve chamber, said passage 222 in turn communicating with passage 224 through the throttle valve 146. Passage 224 is in turn open to exhaust through the manual valve 138 as indicated.

The upward force on the shift valve element 186 produced by the modulated throttle pressure is opposed by a downwardly directed force produced by governor pressure which acts on the upper valve land 226 and on the differential area produced by the shift valve lands 228 and 230. Governor pressure is supplied to the shift valve through passage 232 which in turn communicates with the passage 234 extending to the discharge side of the tail shaft driven pump 130. Passage 234 extends to the aforementioned passage 194 and communication therebetween is regulated by a rear pump check valve 236. The valve 236 assumes the position shown when the front pump 62 is operating since the discharge thereof is greater than the maximum discharge pressure of the rear pump 130. However, under push start conditions when the front pump 62 is not operating, the rear pump 130 will be effective to supply the pressure requirements of the control circuit, the pressurized fluid passing from passage 234 and through the one-way check valve 236 into control pressure passages 194 and 158.

The governor pressure delivered to the shift valve 142 by passage 232 is caused to act on the differential area produced by valve lands 228 and 230 and on the upper side of valve land 226 to urge the valve element 186 in a downward direction against the opposing force of spring 220 and the modulated throttle pressure. The magnitude of the governor pressure in passage 232 is controlled by governor valve 152 which may be mounted on the transmission tail shaft in a conventional fashion as viewed in FIGURE 1. The housing for governor valve 152 defines a counterweight shown in FIGURE 1 at 153. Governor valve 152 comprises a movable valve element 238 which may be mounted in a transversely situated valve cavity and adapted to rotate about the axis of the tail shaft schematically designated in FIGURE 2 by the axis line 240. The upper end of the governor valve cavity communicates with passage 232 through branch passage 242 and an exhaust port communicates with the governor valve cavity at a point intermediate the ends thereof as shown at 244. The valve element 238 is acted upon by centrifugal force as the transmission tail shaft is rotated and is caused to progressively restrict the degree of communication between the passage 232 and the exhaust port 234. During high vehicle speed operation the exhaust port 244 is restricted to a relatively high degree thereby creating a back pressure in passage 242, the magnitude of which is an indicator of the speed of rotation of the tail shaft. A calibrated restriction 246 is located in passage 234 to prevent an excessive flow of fluid from the discharge side of pump 130 while the transmission tail shaft is operating at very low speeds.

It is thus apparent that the shift point at which an upshift will take place from low gear operation to high gear operation will be determined by the magnitude of the forces established by the throttle pressure and by governor pressure, the shift valve 142 responding to variations in these forces to produce an upshift at a higher engine speed at a relatively advanced throttle setting than the corresponding engine speed at which an upshift would occur at a relatively reduced throttle setting.

The above-mentioned orifice control valve 140 comprises a valve cavity within which is slidably positioned a valve element 248 and a valve plunger 250, the former controlling the degree of communication between spaced valve ports which partly define the passage 188, one of said ports including a precalibrated restriction 252. The valve element 248 is urged in a downward direction as viewed in FIGURE 2 by a valve spring and it is urged in an upward direction by governor pressure supplied to the lower end of the orifice control valve cavity by a passage 254 which communicates with passage 232 as shown. Valve plunger 250 may be subjected at the lower side thereof to throttle pressure which is transmitted to the orifice control valve cavity by a throttle pressure passage 256 communicating with passage 206. It will be apparent that the valve element 248 will assume a downward position whenever the governor pressure and the throttle pressure are insufficient to overcome the force of the valve spring thereby introducing the restriction 252 into the passage 188. When the valve element 248 assumes an upward position the restriction 252 is bypassed as indicated.

The orifice control valve 140 functions to delay the application of brake band 132 during a closed throttle downshift thereby making certain that the direct drive clutch 88 is fully disengaged before the brake band servo 148 is energized. It also functions to cushion the engagement of the brake band 132 under such conditions. The use of both throttle pressure and governor pressure to control the operation of the orifice control valve 148 is required since each pressure imposes independent conditions. For example, during advanced throttle low speed operation when the transmission is operating in the direct drive ratio, governor pressure alone may be insufficient to maintain the valve element 248 in the upward position shown in FIGURE 2; and if a downshift is then initiated, a considerable delay will occur before the brake band 132 becomes applied following the disengagement of the direct drive clutch. This would cause an undesirable engine "run away." Conversely, if throttle pressure alone is used in actuating the orifice control valve, it would be possible for the valve element 248 to assume a downward position when the vehicle is operating at relatively high speeds in the low transmission gear ratio; and when the vehicle operator releases the throttle, an upshift will occur. Under such conditions, the direct drive clutch will be engaged considerably in advance of the complete disengagement of the brake band 132 thereby causing an undesirable overlap in the operation of the direct drive clutch and the low speed brake.

When the manual valve 138 is moved to the low range designated by the letter L in FIGURE 2, control pressure will be distributed to passages 224 and 222. When the valve element 186 is in the upshift position as shown in FIGURE 2 prior to the movement of the manual valve 138 to the low range position, control pressure will be transferred from passage 222 to the passage 214 through the shift valve chamber thereby subjecting the lower side of the valve land 230 and the differential area produced by valve lands 216 and 218 to an upwardly directed force. When the throttle modulator valve element 208 is in a downward position, control pressure is free to pass from conduit 222 through the throttle modulator valve into passage 212; and when the shift valve element 186 is in the downshift position, communication is established from passage 212 to passage 214 to maintain the valve element 186 in a downshift position and to prevent a subsequent upshift.

To obtain reverse drive, the manual valve 138 is moved to the reverse drive position designated by the letter R thereby causing the apply side of the brake servo 148 to be exhausted through the manual valve. Also, since the shift valve is in a downshift position prior to movement of the manual valve to the reverse position, the direct drive clutch is exhausted through port 192 in the shift valve 142. The manual valve 138 further provides communication under these conditions between control passage 158 and passage 258, the latter extending to the apply side of reverse brake band servo 150. The transmission is thus conditioned for reverse drive operation as previously explained.

It is apparent from the foregoing description that the various clutch and brake servos are energized during operation to establish one or more power delivery paths through the gear portion of the transmission mechanism and the operating sequence is automatically established by the shift valve 142 acting in response to engine torque and vehicle speed signals from the throttle valve and the governor mechanism respectively. However, since the required degree to which the various servos must be energized is determined by the torque requirements, the operating level of the control pressure must be varied in accordance with variations in the magnitude of the torque being delivered to the vehicle traction wheels. This is accomplished by the compensator valve 154 acting in co-operation with the main regulator valve 156, the compensator valve 154 being responsive to throttle pressure and the governor pressure to establish a regulated compensator pressure as previously described. If the magnitude of the control pressure is greater than that which is dictated by the torque requirements of the transmission, the various shifts above described would be harsh due to the sudden application of the clutch or brake friction components and the transmission would lack that degree of smoothness desirable in automotive type automatic transmissions. On the other hand, if the magnitude of the control pressure is lower than that required by the clutch and brake servos for any given driving condition, the friction elements will slip and be ineffective to transmit full driving power to the traction wheels.

As best seen in FIGURE 2, compensator pressure is delivered from the compensator valve 154 to the main regulator valve 156 through passage 260. The compensator pressure is caused to act on the lower end of the valve land 168 and to oppose the biasing force of valve spring 172. It is thus seen that an increase in the magnitude of the compensator pressure in passage 260 will be accompanied by an increased bypass flow from the discharge side of pump 62 to the low pressure sump 164 thereby causing the effective control pressure to decrease. Conversely, a decrease in the magnitude of the compensator pressure will be accompanied by an increase in the magnitude of the control pressure.

As best seen in FIGURE 3, the compensator valve 154 is comprised of a multiple land valve chamber within which is positioned the compensator valve element 262. Control pressure is transmitted from the main regulator valve 136 to the compensator valve chamber through passage 196 and a branch passage 264, the latter communicating with the compensator valve chamber at a relatively spaced location with respect to the compensator pressure passage 260. The degree of communication between passages 264 and 260 is controlled by a valve land 266. The compensator pressure in passage 260 acts against the differential area produced by the valve land 266 and an adjacent valve land 268. A valve plug 270 is positioned in the left end of the compensator, as viewed in FIGURE 3, and held in a relatively fixed position. A first valve spring 272 is interposed between the plug 270 and the valve element 262 for urging the latter in a right-hand direction, as viewed in FIGURE 3, to oppose the oppositely directed force produced by compensator pressure. The end of the plug 270 is adapted to receive a plunger 274 which is capable of limited axial movement relative to plug 270.

A second valve spring 276 is situated between the plug 270 and the valve element 262 and is adapted to act upon the valve spring seat 278. A slidable shaft 280 may be mounted within an axial opening in the plug 270 and it is capable of transmitting a fluid pressure force under certain driving conditions from the plunger 274 to the valve element 262 as will subsequently be explained.

Throttle pressure is transmitted to opposed sides of the compensator valve chamber through throttle pressure passage 206 and communicating passages 282, 284 and 286. The throttle pressure in passage 286 tends to urge the compensator valve element 262 in a leftward direction, as viewed in FIGURE 3, thereby decreasing the degree of communication between control pressure passage 264 and compensator pressure passage 260. An increase in throttle pressure is therefore accompanied by a decrease in compensator pressure.

An auxiliary governor pressure cutoff member 288 is positioned within a cylindrical chamber 290 in the valve casing adjacent the compensator valve chamber and it is formed with differential diameter portions producing a differential area 292 which may be subjected to control pressure by means of a branch passage 294 communicating with control pressure passage 196. The member 288 is urged in a left-hand direction, as viewed in FIGURE 3, by valve spring 296. Control pressure also communicates with the end of the chamber 290 through an auxiliary control pressure passage 298 for producing a force which opposes the force of the valve spring 296 and for producing a force on valve 262 to effect a decrease in compensator pressure. As best seen in FIGURE 2, the auxiliary control pressure passage 298 extends to passage 258 and it is pressurized whenever the manual valve 138 is shifted to a reverse drive position.

Governor pressure is supplied to the portion of the compensator valve chamber occupied by valve springs 272 and 276 as indicated and governor pressure is also supplied to the chamber 290 on one side of the member 288 through a branch passage 300 to produce a biasing force which supplements the biasing action of the spring 296.

During operation in low vehicle speeds the magnitude of the line pressure acting on the differential area 292 of the member 288 is sufficient to maintain the member 288 in an inoperative position against the right-hand end of the cooperating chamber 290, the magnitude of the governor pressure and the constant spring pressure of the spring 296 being insufficient to overcome the effect of the line pressure. Similarly, at relatively low throttle settings the magnitude of the throttle pressure acting on the plunger 274 is insufficient to overcome the opposing force of the inner valve spring 276. It is thus apparent that during low speed, reduced throttle operation the valve biasing forces on the valve element 262 produced by the throttle pressure and by the compensator pressure will be opposed by the forces produced by the governor pressure and by the two valve springs 272 and 276. The magnitude of the resulting compensator pressure will be a function of both throttle setting and vehicle speed during this drive interval.

The torque delivered to the traction wheels falls off very rapidly in a power installation of this type after the vehicle begins to accelerate and the appropriate change in the magnitude of the compensator pressure is automatically obtained by reason of the combined influence of the governor pressure and the throttle pressure on the compensator valve element 262. When the vehicle continues to accelerate the magnitude of the governor pressure progressively increases, and for a given throttle setting this is accompanied by a corresponding increase in the magnitude of the compensator pressure. However, the rate of change in torque delivered to the traction wheels for a given change in vehicle speed quickly decreases after the transmission torque converter reaches the coupling point and after the vehicle engine has reached its optimum running speed. After this point is reached it is undesirable to allow the compensator pressure to continue increasing since the capacity of the transmission servos would no longer match the torque transmitting requirements. Accordingly, the dimensions of the member 288 and the valve spring 296 are calibrated so that the member 288 will be shifted into engagement with the end of the valve element 262 when this operating condition is reached. Thereafter, any further increase in governor pressure in the compensator valve chamber will be accompanied by a corresponding increase in governor pressure in the chamber 290 and the resulting opposed governor pressure forces on the valve 262 will substantially cancel each other thereby rendering the compensatory valve substantially insensitive to the vehicle speed.

If it is further assumed that the engine throttle is progressively advanced starting from a zero throttle position, the engine torque will initially vary as a substantially direct function thereof until a limiting range of throttle positions is reached. Any further changes in throttle setting beyond a limiting setting in this range will be accompanied by a relatively slight change in engine torque. Normally the spring 276 and the dimensions of the plunger 274 are calibrated so that the spring seat 278 will bottom against the valve 262 at any throttle setting in excess of the limiting setting. The effective area on the right end of the compensator valve element 262 over which throttle pressure is caused to act is substantially equal to the lateral working area of the plunger 274. It is therefore apparent that any further increase in engine throttle setting beyond the abovementioned limiting setting will not influence the position of the valve element 262 since the opposed throttle pressure forces acting on valve element 262 will cancel each other. According to a preferred embodiment, the vehicle speed at which the governor pressure cutoff member 288 functions under full throttle operation is about 20 m.p.h., and the throttle setting at which the throttle pressure cutoff plunger 274 will be caused to function is about 60% of the wide open throttle setting.

What we claim and desire to secure by U.S. Letters Patent is:

1. In a control valve circuit for an automatic power transmission including fluid pressure operated servos, a fluid control pressure source and conduit structures providing controlled communication between said pressure source and said servos; pressure regulator valve means for regulating the operating control pressure level established by said pressure source, a compensator valve means for modulating said control pressure and for producing a compensator pressure, said circuit including first and second pressure regulating components for producing separate fluid pressure signals, said compensator valve means being subjected to each of said pressure signals and actuated thereby to establish a compensator pressure level, and means for overruling the influence of each of said pressure signals when the magnitude of the respective signals exceeds a predetermined value for any given operating condition, said regulator valve means including portions subjected to said compensator pressure whereby the regulating characteristics of said regulating valve means are influenced by said compensator pressure to establish a control pressure which is a function of said pressure signals.

2. In a power transmitting mechanism for transferring power from a power source to a driven member, a control valve circuit including a fluid pressure source and fluid pressure operated servos, conduit structure interconnecting said pressure source and said servos, a pressure regulator valve mechanism forming a portion of said conduit structure and adapted to establish a uniform control pressure level, a compensator valve means for establishing a modulated control pressure, said pressure regulator valve mechanism including a portion subjected to said modulated control pressure whereby the regulated control pressure level is determined in part by the magnitude of said modulated control pressure, a source of driven speed responsive pressure and a source of driving torque demand responsive pressure, said compensator valve means being subjected to said speed and torque demand responsive pressures and actuated thereby, and separate means for rendering said compensator valve relatively insensitive to variations in said speed responsive pressure and said torque demand responsive pressure respectively, when the respective magnitudes thereof are within a predetermined range for any given operating condition.

3. In a power transmitting mechanism for transferring power from a throttle controlled internal combustion engine to a driven member; a control valve circuit including an engine driven pump and fluid pressure operated servos, conduit structure interconnecting said pump and said servos, a pressure regulator valve mechanism forming a portion of said conduit structure and adapted to establish a uniform control pressure level in said circuit, a compensator valve means for establishing a modulated control pressure in said circuit, said pressure regulator valve mechanism including a portion subjected to the force of said modulated control pressure whereby the control pressure level is determined in part by the magnitude of said modulated control pressure, a source of speed governor pressure which is proportional in magnitude to the driven speed of said driven member including a fluid governor pump drivably connected to said driven member, a throttle valve means for establishing in said control circuit a throttle pressure which is proportional in magnitude to the engine torque demand, said compensator valve means being subjected to said governor pressure and said throttle pressure to establish opposed valve actuating forces and separate means for rendering said compensator valve means relatively insensitive to variations in the magnitude of said speed responsive pressure and to said throttle pressure within predetermined operating ranges.

4. In a control system for an automatic power transmission mechanism capable of delivering power from a vehicle engine to a driven member, said control system including a fluid pressure source and a regulator valve means for maintaining a uniform operating control pressure in said system; a compensator valve mechanism capable of establishing a modulated control pressure and including a valve chamber, a spool valve element situated in said valve chamber, means for subjecting a portion of said regulator valve means to said modulated control pressure to influence the pressure regulating characteristics thereof, a control pressure passage and a modulated control pressure passage communicating with said valve chamber, said valve element establishing controlled communication between said passages, means for subjecting a first portion of said valve element to a driven speed governor responsive pressure, means for subjecting a second opposed portion of said valve element to an engine torque demand responsive pressure, said speed and torque demand responsive pressures establishing opposed valve actuating forces, a valve plunger positioned adjacent one side of said valve element, and passage means for conducting governor pressure to one side of said valve plunger to urge the same into engagement with said valve element, a portion of said valve plunger being subjected to control pressure thereby establishing a force which opposes the force of said governor pressure, said valve plunger being held out of engagement with said valve element when the relative magnitude of the control pressure with respect to the governor pressure exceeds a predetermined value.

5. The combination as set forth in claim 4 wherein said valve plunger is adapted to urge said valve element in one direction when it engages the same and wherein the governor pressure acting on said first valve element portion establishes an opposed valve biasing force.

6. The combination as set forth in claim 5 wherein the effective working area on said one side of the valve plunger is substantially equal to the effective working area on said first valve element portion.

7. In a control system for an automatic power transmission mechanism capable of delivering power from a vehicle engine to a driven member, said control system including a fluid pressure source and a regulator valve means for maintaining a uniform operating control pressure in said system; a compensator valve mechanism capable of establishing a modulated control pressure, a modulated control pressure passage communicating with a portion of said regulator valve means for subjecting the latter to said modulated control pressure to influence the regulating characteristics thereof, said compensator valve mechanism including a valve chamber, a spool valve element situated in said valve chamber, a control pressure passage, each of said pressure passages communicating with said valve chamber, said valve element establishing controlled communication between said pressure passages, means for subjecting a first portion of said valve element to a driven speed responsive pressure, means for subjecting a second opposed portion of said valve element to an engine torque demand responsive pressure, a valve piston slidably mounted in a portion of said compensator valve mechanism adjacent said first valve element portion, spring means interposed between said valve element and said valve piston for urging the same apart and a branch passage for subjecting one side of said piston to said torque demand responsive pressure, said speed and torque demand responsive pressures establishing opposed valve element actuating forces, means for directly transmitting the fluid pressure forces acting on said valve piston to said valve element when the torque demand responsive pressure exceeds an established limiting value, the valve element actuating force established by said torque demand responsive pressure acting on said second valve element portion thereby being substantially canceled by the opposed force established by the torque demand responsive pressure acting on said valve piston when the magnitude of said torque demand responsive pressure exceeds said limiting value.

8. In a control system for an automatic power transmission mechanism capable of delivering power from a vehicle engine to a driven member, said control system including a fluid pressure source and a regulator valve means for maintaining a uniform operating control pressure in said system; a compensator valve mechanism capable of establishing a modulated control pressure, a modulated control pressure passage communicating with a portion of said regulator valve means for subjecting the latter to said modulated control pressure to influence the regulating characteristics thereof, said compensator valve mechanism including a valve chamber, a spool valve element situated in said valve chamber, a control pressure passage, each of said pressure passages communicating with said valve chamber, said valve element establishing controlled communication between said pressure passages, means for subjecting a first portion of said valve element to a driven speed responsive pressure, means for submitting a second portion of said valve element to an engine torque demand responsive pressure, said speed and torque demand responsive pressures establishing opposed valve actuating forces, a first valve plunger positioned adjacent one side of said valve element, a second valve plunger positioned adjacent the other side of said valve element, first branch passage means for conducting governor pressure to one side of said first valve plunger to urge the same toward said valve element, a portion of said first valve plunger being subjected to control pressure thereby establishing a force which opposes the force of said governor pressure, and second branch passage means for subjecting one side of said second plunger to torque demand responsive pressure, spring means acting on said second plunger for opposing the force established by said torque demand responsive pressure on the same, said first valve plunger being held out of engagement with said valve element when the relative values of the control pressure and the governor pressure are within a predetermined operating range and means for transferring the pressure force acting on said second plunger to said valve element when the torque demand responsive pressure exceeds a predetermined value.

9. The combination as set forth in claim 8 wherein the effective working area on said second valve plunger is substantially equal to the effective working area on said second valve element portion and wherein the effective working area on said first valve plunger over which speed responsive pressure is caused to act is substantially equal to the effective working area of said first valve element portion.

10. In a control system comprising a source of control pressure, a compensator valve structure including a multiple land valve chamber, a spool valve element positioned in said valve chamber, a control pressure passage and a compensator pressure passage communicating with said valve chamber, said valve element including valve lands adapted to control the degree of communication between said control pressure passage and said compensator pressure passage, a first valve plunger slidably mounted adjacent one end of said valve element, a second valve plunger slidably mounted adjacent the other end of said valve element, spring means for urging said second valve plunger away from said valve element, first branch passage means for subjecting one portion of said first valve plunger to control pressure for urging the later out of engagement with said valve element, second branch passage means for subjecting one side of said second valve plunger and said one end of the valve element to a first regulating pressure signal, third branch passage means for subjecting one side of said first valve plunger and said other end of said valve element to a second regulating pressure signal, means for transferring the pressure force established by said first pressure signal on said second valve plunger to said valve element when said second pressure signal exceeds an established limiting value thereby substantially conceling the effect of said second pressure signal on the regulating characteristic of said valve element and means for directly transferring the pressure force established by said second pressure signal on said first valve plunger when the relative values of the control pressure and said second pressure signal are within a predetermined operating range.

11. The combination as set forth in claim 10 wherein said compensator valve structure includes a second spring means for continuously urging said valve element in one direction to supplement the biasing force of said second pressure signal.

12. The combination as set forth in claim 10 wherein said compensator valve structure includes a valve spring positioned adjacent said one side of said first valve plunger to supplement the biasing action of said first pressure signal.

13. The combination as set forth in claim 10 wherein said valve element and said first and second valve plungers are situated in aligned, co-axial relationship.

14. In a control valve circuit for an automatic power transmission mechanism including fluid pressure operated servos, a fluid control pressure source and conduit structures providing controlled communication between said pressure source and said servos; pressure regulator valve means for regulating the operating control pressure level established by said pressure source, a compensator valve means for modulating said control pressure and for producing a compensator pressure including a valve chamber, a compensator valve element situated in said valve chamber, said circuit including first and second pressure regulating components for producing separate fluid pressure signals, means for subjecting said compensator valve element to each of said pressure signals to establish balanced valve element actuating forces, including two opposed fluid pressure forces established by said pressure signals, throughout the ranges of variations of said signals, whereby a desired compensator pressure level is maintained, and means forming a part of said compensator valve means for opposing and balancing the influence of one of said pressure signals when the magnitude of said one signal exceeds a predetermined value for any given operating condition, said regulator valve means including portions subjected to said compensator pressure whereby the regulating characteristics of said regulating valve means are influenced by said compensator pressure to establish a control pressure which is a function of said pressure signals.

15. In a power transmitting mechanism for transferring power from a power source to a driven member, a control valve circuit including a fluid pressure source and fluid pressure operated servos, conduit structure interconnecting said pressure source and said servos, a pressure regulator valve mechanism forming a portion of said conduit structure and adapted to establish a uniform control pressure level, a compensator valve means for establishing a modulated control pressure including a valve chamber, a compensator valve element situated in said valve chamber, said pressure regulator valve mechanism including a portion subjected to said modulated control pressure whereby the regulated control pressure level is determined in part by the magnitude of said modulated control pressure, a source of driven speed responsive pressure and a source of driving torque demand responsive pressure, means for subjecting said compensator valve element to said speed and torque demand responsive pressures to establish balanced valve element actuating forces, including two opposed fluid pressure forces established by said torque demand responsive pressure and said driven speed responsive pressure, throughout the speed range of said driven member, and means forming a part of said compensator valve means for rendering said compensator valve means relatively insensitive to variations in said speed responsive pressure when the magnitude thereof is within a predetermined range for any given operating condition.

16. In a power transmitting mechanism for transferring power from a power source to a driven member, a control valve circuit including a fluid pressure source and fluid pressure operated servos, conduit structure interconnecting said pressure source and said servos, a pressure regulator valve mechanism forming a portion of said conduit structure and adapted to establish a uniform control pressure level, a compensator valve means for establishing a modulated control pressure, said pressure regulator valve mechanism including a portion subjected to said modulated control pressure whereby the regulated control pressure level is determined in part by the magnitude of said modulated control pressure, a source of driven speed responsive pressure and a source of driving torque demand responsive pressure, said compensator valve means being subjected to said speed and torque demand responsive pressures and actuated thereby, and means forming a part of said compensator valve means for opposing and balancing said torque demand responsive pressure and for rendering said compensator valve means relatively insensitive to variations in said torque demand responsive pressure when the magnitude thereof is within a predetermined range for any given operating condition.

17. In a power transmitting mechanism for transferring power from a throttle controlled internal combustion engine to a driven member; a control valve circuit including an engine driven pump and fluid pressure operated servos, conduit structure interconnecting said pump and said servos, a pressure regulator valve mechanism forming a portion of said conduit structure and adapted to establish a uniform control pressure level in said circuit, a compensator valve means for establishing a modulated control pressure in said circuit including a valve chamber, a compensator valve element situated in said valve chamber, said pressure regulator valve mechanism including a portion subjected to the force of said modulated control pressure whereby the control pressure level is determined in part by the magnitude of said modulated control pressure, a source of speed governor pressure which is proportional in magnitude to the driven speed of said driven member including a fluid governor pump drivably connected to said driven member, a throttle valve means for establishing in said control circuit a throttle pressure which is proportional in magnitude to the engine torque demand, means for adjusting said compensator valve element to said governor pressure and said throttle pressure to establish opposed valve element actuating forces, including two opposed fluid pressure forces established by said governor pressure and said throttle pressure, throughout the speed range of said driven member, and means for rendering said compensator valve means relatively insensitive to variations in the magnitude of said speed responsive pressure when the magnitude of the latter is within a predetermined range for any given operating condition.

18. In a power transmitting mechanism for transferring power from a throttle controlled internal combustion engine to a driven member; a control valve circuit including an engine driven pump and fluid pressure operated servos, conduit structure interconnecting said pump and said servos, a pressure regulator valve mechanism forming a portion of said conduit structure and adapted to establish a uniform control pressure level in said circuit, a compensator valve means for establishing a modulated control pressure in said circuit, said pressure regulator valve mechanism including a portion subjected to the force of said modulated control pressure whereby the control pressure level is determined in part by the magnitude of said modulated control pressure, a source of speed governor pressure which is proportional in magnitude to the driven speed of said driven member including a fluid governor pump drivably connected to said driven member, a throttle valve means for establishing in said control circuit a throttle pressure which is proportional in magnitude to the engine torque demand, said compensator valve means being subjected to said governor pressure and said throttle pressure to establish opposed valve actuating forces, and means forming a part of said compensator valve means for opposing and balancing said throttle pressure and for rendering said compensator valve means relatively insensitive to variations in the magnitude of said throttle pressure when the latter is within a predetermined range for any given operating condition.

19. In a control system for an automatic power transmission mechanism capable of delivering power from a vehicle engine to a driven member, said control system including a fluid pressure source and a regulator valve means for maintaining a uniform operating control pressure in said system; a compensator valve mechanism capable of establishing a modulated control pressure and including a valve chamber, a spool valve element situated in said valve chamber, means for subjecting a portion of said regulator valve means to said modulated control pressure to influence the pressure regulating characteristics thereof, a control pressure passage and a modulated control pressure passage communicating with said valve chamber, said valve element establishing controlled communication between said passages, means for subjecting a first portion of said valve element to a driven speed responsive pressure force, means for subjecting a second opposed portion of said valve element to an engine torque demand responsive pressure force, said speed and torque demand responsive pressures establishing opposed valve actuating forces, a valve plunger positioned adjacent one side of said valve element, and passage means for conducting speed responsive pressure to one side of said valve plunger to urge the same toward said valve element, a portion of said valve plunger being subjected to control pressure thereby establishing a force which opposes the force of said speed responsive pressure, said speed responsive pressure overruling the control pressure force acting on said valve plunger when the relative magnitude of the speed responsive pressure with respect to the control pressure exceeds a predetermined value.

References Cited in the file of this patent
UNITED STATES PATENTS

| | | |
|---|---|---|
| 2,770,148 | Wayman | Nov. 13, 1956 |
| 2,855,803 | Knowles | Oct. 14, 1958 |
| 2,893,261 | Flinn | July 7, 1959 |